United States Patent
Reibman et al.

(10) Patent No.: US 9,521,443 B2
(45) Date of Patent: Dec. 13, 2016

(54) METHOD AND APPARATUS FOR GENERATING QUALITY ESTIMATORS

(71) Applicant: AT&T Intellectual Property I, LP, Atlanta, GA (US)

(72) Inventors: Amy Ruth Reibman, Chatham, NJ (US); Kenneth Shirley, New York, NY (US); Chao Tian, Madison, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 14/658,746

(22) Filed: Mar. 16, 2015

(65) Prior Publication Data

US 2015/0189342 A1 Jul. 2, 2015

Related U.S. Application Data

(63) Continuation of application No. 14/026,072, filed on Sep. 13, 2013, now Pat. No. 9,008,427.

(51) Int. Cl.
*H04N 21/25* (2011.01)
*G06K 9/62* (2006.01)
(Continued)

(52) U.S. Cl.
CPC ............ *H04N 21/252* (2013.01); *G06K 9/036* (2013.01); *G06K 9/40* (2013.01); *G06K 9/6201* (2013.01);
(Continued)

(58) Field of Classification Search
CPC ............ H04N 21/252; H04N 21/23418; H04N 21/23439; H04N 21/25891; H04N 21/266; H04N 21/64322; G06K 9/036; G06K 9/40; G06K 9/6201; G06T 7/0002; G06T 2207/30168
See application file for complete search history.

(56) References Cited

U.S. PATENT DOCUMENTS 4,258,385 A 3/1981 Greenberg et al.
5,594,467 A 1/1997 Marlton et al.
(Continued)

FOREIGN PATENT DOCUMENTS

CN 101984452 A 3/2011
GB 2369260 A 5/2002
(Continued)

OTHER PUBLICATIONS

Matlosz, Kerry , "Bayesian Multidimensional Scaling Model for Ordinal Preference Data", Columbia University, 2013.

*Primary Examiner* — Manav Seth
(74) *Attorney, Agent, or Firm* — Guntin & Gust, PLC; Joseph Hrutka

(57) ABSTRACT

A system that incorporates teachings of the present disclosure may include, for example, sampling a variable effect distribution of viewing preference data to determine a first set of effects comprising a plurality of first distortion type effects associated with a first distortion type of a first image and to determine a second set of effects comprising a plurality of second distortion type effects associated with the second distortion type of a second image, calculating a preference estimate from a logistic regression model of the viewing preference data according to the first set of effects and the second set of effects, wherein the preference estimate comprises a probability that the first image is preferred over the second image, and selecting one of the first distortion type or the second distortion type according to the preference estimate. Other embodiments are disclosed.

20 Claims, 9 Drawing Sheets

(51) Int. Cl.
*H04N 21/234* (2011.01)
*H04N 21/2343* (2011.01)
*H04N 21/258* (2011.01)
*H04N 21/266* (2011.01)
*H04N 21/643* (2011.01)
*G06K 9/03* (2006.01)
*G06K 9/40* (2006.01)
*G06T 7/00* (2006.01)

(52) U.S. Cl.
CPC ....... *G06T 7/0002* (2013.01); *H04N 21/23418* (2013.01); *H04N 21/23439* (2013.01); *H04N 21/25891* (2013.01); *H04N 21/266* (2013.01); *H04N 21/64322* (2013.01); *G06T 2207/30168* (2013.01)

(56) References Cited

U.S. PATENT DOCUMENTS

| | | | |
|---|---|---|---|
| 5,828,384 A | 10/1998 | Iwasaki et al. | |
| 6,384,846 B1 | 5/2002 | Hiroi | |
| 6,442,573 B1 | 8/2002 | Schiller et al. | |
| 7,088,865 B2 | 8/2006 | Ejima et al. | |
| 7,138,989 B2 | 11/2006 | Mendelson et al. | |
| 7,408,528 B2 | 8/2008 | Gunji | |
| 7,444,038 B2 | 10/2008 | Shimizu et al. | |
| 7,558,320 B2 | 7/2009 | Winder et al. | |
| 7,587,099 B2 | 9/2009 | Szeliski et al. | |
| 7,603,276 B2 | 10/2009 | Yoshizawa | |
| 7,606,412 B2 | 10/2009 | Huh et al. | |
| 7,634,186 B2 | 12/2009 | Nojima | |
| 7,714,898 B2 | 5/2010 | Pilu | |
| 7,719,543 B2 | 5/2010 | Jabri et al. | |
| 7,835,576 B2 | 11/2010 | Kang et al. | |
| 7,965,203 B2 * | 6/2011 | Yamagishi | H04N 17/004 340/988 |
| 8,150,574 B2 | 4/2012 | Han et al. | |
| 8,254,669 B2 | 8/2012 | Nishida | |
| 8,275,200 B2 * | 9/2012 | Bilcu | G06T 5/004 382/167 |
| 8,285,058 B2 | 10/2012 | Sarkar | |
| 8,428,342 B2 | 4/2013 | Tian et al. | |
| 8,451,321 B2 | 5/2013 | Kuwabara et al. | |
| 8,503,015 B2 | 8/2013 | Gustafson et al. | |
| 8,660,342 B2 * | 2/2014 | Obrador | G06T 7/0002 162/165 |
| 8,830,341 B2 | 9/2014 | Pore | |
| 8,867,013 B2 * | 10/2014 | Krishnakumar | H04N 7/148 348/189 |
| 2001/0024292 A1 | 9/2001 | Otake | |
| 2002/0051584 A1 | 5/2002 | Shimizu et al. | |
| 2003/0053683 A1 | 3/2003 | Newman et al. | |
| 2003/0063779 A1 * | 4/2003 | Wrigley | G06Q 30/02 382/116 |
| 2004/0150650 A1 | 8/2004 | Mendelson et al. | |
| 2004/0165769 A1 | 8/2004 | Huh et al. | |
| 2006/0115145 A1 | 6/2006 | Bishop et al. | |
| 2007/0052716 A1 | 3/2007 | Jabri et al. | |
| 2007/0115841 A1 | 5/2007 | Taubman | |
| 2008/0310736 A1 | 12/2008 | Chattopadhyay et al. | |
| 2009/0174761 A1 | 7/2009 | Hoory | |
| 2009/0196592 A1 | 8/2009 | Nojima | |
| 2009/0290037 A1 | 11/2009 | Pore | |
| 2011/0211253 A1 | 9/2011 | Brueck | |
| 2012/0020415 A1 | 1/2012 | Yang et al. | |
| 2012/0163711 A1 | 6/2012 | Nagone | |
| 2013/0022257 A1 | 1/2013 | Omernick et al. | |
| 2013/0051687 A1 | 2/2013 | Kuroki et al. | |
| 2013/0129196 A1 | 5/2013 | Paris et al. | |
| 2013/0142451 A1 | 6/2013 | Reibman et al. | |
| 2013/0151441 A1 | 6/2013 | Archambeau et al. | |
| 2013/0188866 A1 * | 7/2013 | Obrador | G06T 7/0002 382/165 |

FOREIGN PATENT DOCUMENTS

| | | |
|---|---|---|
| JP | 2002354185 A | 12/2002 |
| WO | 2011/019384 | 2/2011 |

\* cited by examiner

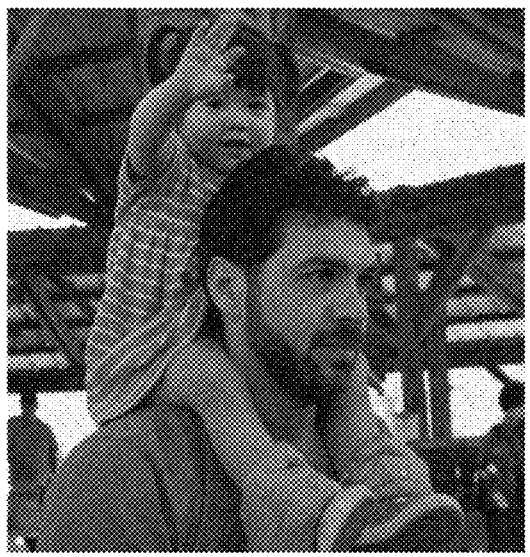
200
FIG. 2A
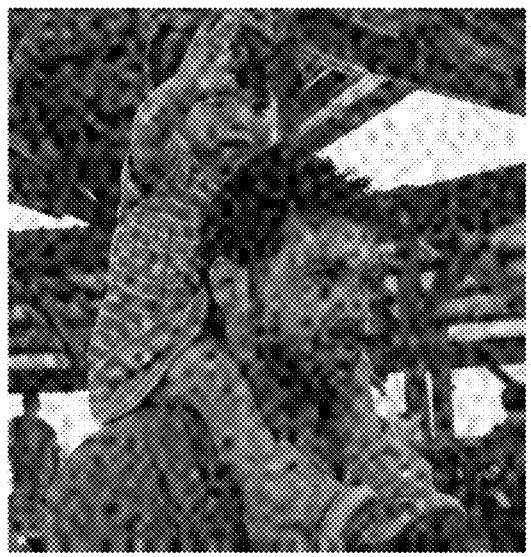
250
FIG. 2B
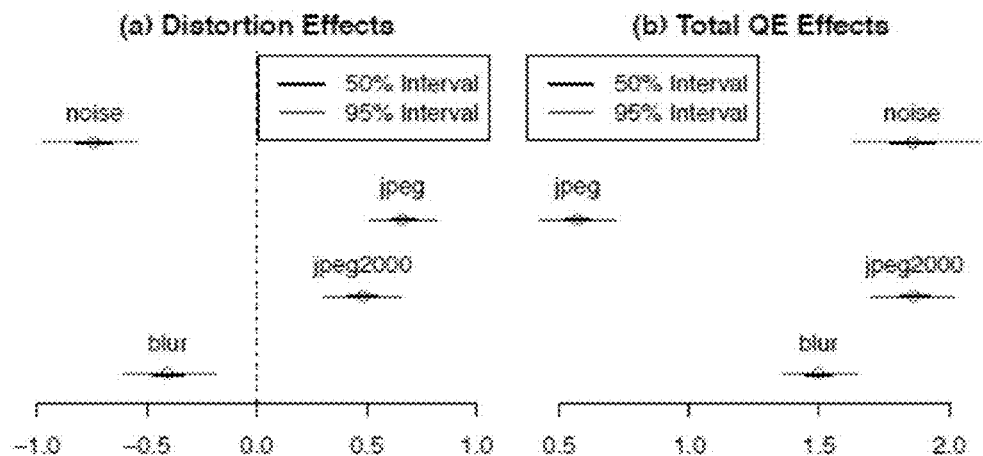
300
FIG. 3A
350
FIG. 3B

400

450

540

METHOD AND APPARATUS FOR GENERATING QUALITY ESTIMATORS

CROSS-REFERENCE TO RELATED APPLICATIONS

This application is a continuation of and claims priority to U.S. patent application Ser. No. 14/026,072, filed Sep. 13, 2013. The contents of the foregoing are hereby incorporated by reference into this application as if set forth herein in full.

FIELD OF THE DISCLOSURE

The present disclosure relates generally to image and video quality and more specifically to generating image and video quality estimators.

BACKGROUND

Quality control for images and video is often implemented based on subjective testing using people that compare different images or video content. A quality estimator can be used to compute a score to estimate perceived quality of a single input image. When comparing image quality estimate scores of two images, there can be is uncertainty as to how to compare such scores or what fraction of viewers might actually prefer the image with the lower score.

BRIEF DESCRIPTION OF THE DRAWINGS

FIGS. 2A and 2B depict an illustrative embodiment of an image pair that is used for performing subjective evaluation;

FIGS. 3A and 3B depict an illustrative embodiment of interval estimates of distortion effects and total quality estimator effects of viewing preference data;

DETAILED DESCRIPTION

Figure 1:
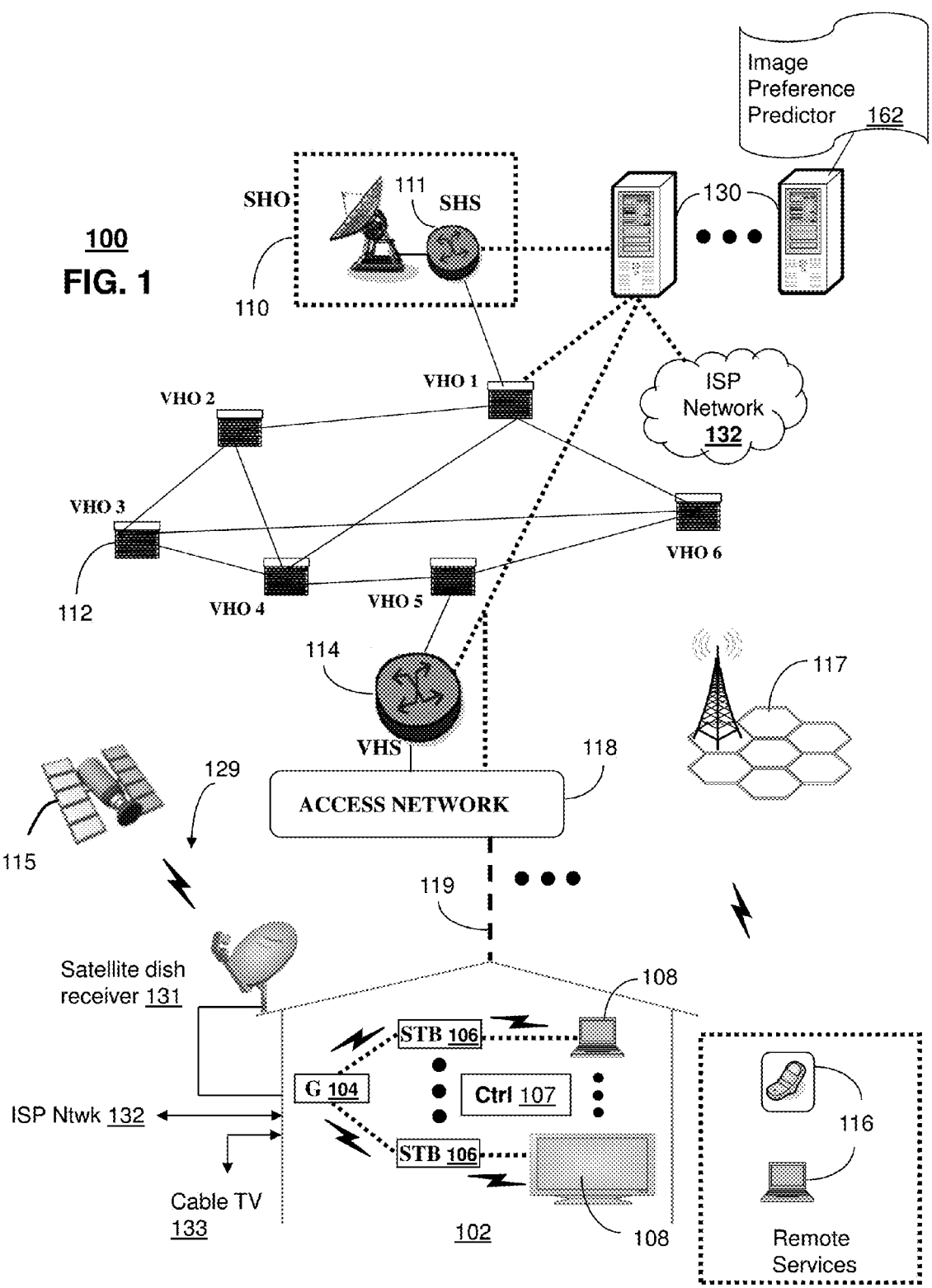
FIG. 1 depicts an illustrative embodiment of a system that provides communication services.

The present disclosure describes, among other things, systems, components and/or methods for predicting image preferences according to quality estimator (QE) modeling. In one or more embodiments, a predictive model can estimate a probability that one image of an image pair will be preferred by a random viewer relative to a second image of the pair. The model can be trained using results from a large-scale subjective test and can present the degree to which various factors influence subjective quality. In one or more embodiments, the model can provide well-calibrated estimates of pairwise image preferences using a validation set of image pairs.

In one or more embodiments, a logistic regression model can be generated from viewing preference data. The viewing preference data can be generated by preparing reference images. The reference images can be processed according to distortion types to create distorted images. In one or more embodiments, distorted images can be presented to viewers, in pairs, and the viewers who can pick which image is of better quality. The data from the viewing preferences can be modeled via a logistic regression model.

In one or more embodiments, the logistic regression model can be used predict which image of a pair of images will likely be preferred over the other. The model can take into account image effects, viewer effects, distortion type effects, and quality estimator effects to calculate a predictive probability that an image that has been generated via a particular distortion type will be preferred over another image in a viewing pair. In one or more embodiments, the model can calculate a confidence level for the probability. In one or more embodiments, the predictive probability can be used to select distortion types, which will correspond to anticipated viewer preferences.

One embodiment of the present disclosure includes a server having a memory and a processor. The memory has executable instructions and the processor circuit is coupled with the memory. The processor, when executing the executable instructions, can perform operations for receiving a request over a network to predict an image preference for an image pair comprising a first image and a second image. The processor can also perform operations for identifying a first distortion type associated with the first image and a second distortion type associated with the second image. The processor can, in turn, perform operations for sampling a variable effect distribution of viewing preference data to determine a first set of effects and a second set of effects. The first set of effects can include a plurality of first reference image effects associated with the first image and a plurality of first distortion type effects associated with the first distortion type. The second set of effects can include a plurality of second reference image effects associated with the second image and a plurality of second distortion type effects associated with the second distortion type. The processor can perform operations for calculating a preference estimate from a logistic regression model of the viewing preference data according to the first set of effects and the second set of effects. The preference estimate can include a probability that the first image is preferred over the second image. In turn, the processor can perform operations for sending the preference estimate over the network.

One embodiment of the present disclosure is a method including identifying, by a processor including a device, a first distortion type associated with a first image of an image pair and a second distortion type associated with a second image of the image pair. The method can further include sampling, by the processor, a variable effect distribution of viewing preference data to determine a first set of effects comprising a plurality of first distortion type effects associated with the first distortion type. The sampling can also include determining a second set of effects comprising a plurality of second distortion type effects associated with the second distortion type. The method can include calculating, by the processor, a preference estimate from a logistic regression model of the viewing preference data according to the first set of effects and the second set of effects. The preference estimate can include a probability that the first image is preferred over the second image. The method can, in turn, include selecting, by the processor, a distortion type for processing media content from a plurality of distortion types according to the preference estimate.

One embodiment of the present disclosure is a computer-readable storage medium including executable instructions, which when executed by a processor cause the processor to perform operations including sampling a variable effect distribution of viewing preference data to determine a first set of effects including a plurality of first distortion type effects associated with a first distortion type of a first image. The sampling can further determine a second set of effects comprising a plurality of second distortion type effects associated with the second distortion type of a second image. The instructions can further cause the processor to perform operations for calculating a preference estimate from a logistic regression model of the viewing preference data according to the first set of effects and the second set of effects. The preference estimate can include a probability that the first image is preferred over the second image. The instructions can, in turn, cause the processor to perform operations for selecting one of the first distortion type or the second distortion type according to the preference estimate.

FIG. 1 depicts an illustrative embodiment of a system 100 for providing predictions of viewer preferences between two images in an image pair. The system 100 can access a model, based on viewing preference data. The system 100 can use the model to determine a probability that a first image will be preferred over a second image and a confidence level for this prediction. The system 100 can be used to select between competing images and/or video. The system 100 can be used to select between competing devices and/or methods for processing, transmitting, and reproducing images and video by predicting which of the competing devices and/or methods will be preferred by viewers.

The system 100 can represent an Internet Protocol Television (IPTV) media system. The IPTV media system can include a super head-end office (SHO) 110 with at least one super headend office server (SHS) 111 which receives content from satellite and/or terrestrial communication systems. In the present context, content can represent in whole or in part, for example, messages, text, audio, moving images such as 2D or 3D videos, video games, virtual reality content, still image content, and combinations thereof. The SHS server 111 can forward packets associated with the media content to one or more video head-end servers (VHS) 114 via a network of video head-end offices (VHO) 112 according to a common multicast communication protocol.

The VHS 114 can distribute multimedia content, including broadcast content, via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provide broadband services over fiber optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control). Other data can be distributed to the media processors 106 via the gateway, including voice messages, text messages, voice communications, video conferencing and combinations thereof.

The gateway 104, the media processors 106, and/or media devices 108 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 106 and subsystems of the IPTV media system for services such as video-on-demand (VoD), browsing an electronic programming guide (EPG), or other infrastructure services.

A satellite broadcast television system 129 can also be used in the system of FIG. 1. The satellite broadcast television system can be overlaid, operably coupled with, or replace the IPTV system as another representative embodiment of communication system 100. In this embodiment, signals transmitted by a satellite 115 carrying media content can be received by a satellite dish receiver 131 coupled to the building 102. Modulated signals received by the satellite dish receiver 131 can be transferred to the media processors 106 for demodulating, decoding, encoding, and/or distributing broadcast channels to the media devices 108. The media processors 106 can be equipped with a broadband port to the ISP network 132 to enable interactive services such as VoD and EPG as described above.

In yet another embodiment, an analog or digital cable broadcast distribution system such as cable TV system 133 can be overlaid, operably coupled with, or replace the IPTV system and/or the satellite TV system as another representative embodiment of communication system 100. In this embodiment, the cable TV system 133 can also provide Internet, telephony, and interactive media services.

The embodiments of the present disclosure can apply to other over-the-air and/or landline media content services system.

Some of the network elements of the IPTV media system can be coupled to one or more computing devices 130, a portion of which can operate as a web server for providing web portal services over an Internet Service Provider (ISP) network 132 to wireline and/or wireless devices, including media devices 108 and/or portable communication devices 116.

Multiple forms of media services can be offered to media devices over landline technologies in communication system 100 such as through the devices and/or techniques described above. Additionally, media services can be offered to media devices by way of a wireless access base station 117 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless network technologies are contemplated by the present disclosure.

System 100 can also provide for all or a portion of the computing devices 130 to function as a probability prediction server for relative quality estimation (herein referred to as server 130). The server 130 can use common computing and communication technology to perform function 162, which can include among things, receiving a request to predict an image preference between two images, identifying competing images, viewers, and/or distortion types that are being compared, sampling a variable effect distribution based on viewing preference data to determine sets of effects for the competing images, viewers, and/or distortion types, and calculating a probability that one image will be preferred over the other image based on the sets of effects. The exemplary embodiments can utilize any number of servers 130 which can implement any number of evaluators 162 for the QEs.

The system 100 can perform image and video capture, compression, transmission, and display. In one embodiment, the server 130 can accurately predict subjective, human quality judgments for a wide range of input content and processing types. The server 130 can accurately mimic human responses in a probabilistic manner using a pairwise-preference predictor which can provide an estimate of the form "a random viewer will prefer the image on the left with a probability of, e.g., 40%". In one embodiment, the server 130 can also attach a margin of error to the estimate. For example, for a group of 100 viewers, the server 130 can provide an interval prediction (i.e. 40+/−6) of the number of viewers who will prefer the left image to the right. The pair-wise probability estimate can out-perform an absolute quality estimate, which can expensive and time consuming to generate and can be limited by human responses that are inherently probabilistic. Inter-viewer variability, based on individual viewer abilities to discriminate, preferences between distortion types, and/or distortions in particular spatial regions of images, can cause unreliable results for an absolute score quality estimate.

In one or more embodiments, the server 130 can model relative quality, in the form of a relative prediction that "an image on the LEFT is better than that one on the RIGHT." The server 130 can provide a relative quality estimate prediction, as opposed to an absolute quality score (e.g., "this image has a quality score of 4.5"). In one or more embodiments, the relative quality estimate can be provided for product and algorithm benchmarking and selection as described, for example, in "No-reference image and video quality estimation: Applications and human-motivated design," by S. S. Hemami and A. R. Reibman, in Signal Processing: Image Communication, August 2010, the disclosure of which is hereby incorporated by reference.

In one or more embodiments, the server 130 provides a relative quality estimate that allows for a probabilistic interpretation. A probabilistic interpretation provides more context than an absolute quality estimate. For example, knowing that two images have absolute quality estimate scores of 2.3 vs. 3.6 is less informative, taken alone, than knowing that 75% of viewers prefer the first image over the second image. This relative estimate of quality can be interpreted by a layperson, while the absolute quality estimate only has meaning to an expert. In one or more embodiments, the predictive model used by server 130 can be based on large scale subjective testing. Viewer preference data can be collected for the generating the predictive model. This data collection can be based on posing a straightforward question of relative preference that can be easily and competently completed by lightly trained viewers as more fully described in "A crowd sourced QoE evaluation framework for multimedia content," by K. T. Chen, C. C. Wu, Y. C. Chang, and C. L. Lei, in Proceedings of the 17th ACM international conference on Multimedia. ACM, 2009, pp. 491-500, the disclosure of which is hereby incorporated by reference.

By comparison, subjective testing methods for absolute ratings require training for viewers to recognize the meaning of a score and to correctly use a dynamic scoring range. This further implies that absolute score data collection is limited and the results thus obtained may not apply to real-life viewers and viewing conditions as well as results obtained via relative preference testing. An absolute quality estimate can be used to decide whether one image has a better (or worse) quality than another, where if their objective quality scores differ by more than a constant threshold ($\Delta o$). However, this is contingent upon the choice of an effective and meaningful $\Delta o$, which does not reflect the probabilistic nature of viewer responses.

In one or more embodiments, the server 130 can provide a probabilistic pairwise-preference predictor (P4), which uses a statistical model for pairwise preferences that is a function of properties of degraded images including reference image, distortion type, and an ensemble of QE scores. In several embodiments, full-reference quality estimators can be used with the pair-wise probability predictor. For example, predictive model can be used with the quality estimator, SSIM, which is described more fully in "Image quality assessment: from error visibility to structural similarity," by Z. Wang, A. C. Bovik, H. R. Sheikh, and E. P. Simoncelli, in IEEE Trans. Image Proc., vol. 13, no. 4, pp. 600-612, April 2004, and incorporated herein by reference in its entirety. Other full-reference quality estimators that can be used include, quality estimator IW-SSIM, described in "Information content weighting for perceptual image quality assessment," by Z. Wang and Q. Li, in IEEE Trans. Image Processing, vol. 0, no. 5, pp. 1185-1198, May 2011, incorporated herein by reference in its entirety; quality estimator PSNR-HVS-M, described in "On between-coefficient contrast masking of DCT basis functions," by N. Ponomarenko et al., in Workshop on Video Processing and Quality Metrics, 2007, incorporated herein by reference in its entirety; quality estimator VIF, described in "Image information and visual quality," by H. R. Sheikh and A. C. Bovik, in IEEE Trans. Image Proc., vol. 15, no. 2, pp. 430-444, February 2006, incorporated herein by reference in its entirety; quality estimator VSNR, described in "VSNR: A wavelet-based visual signal-to-noise ratio for natural images," by D. M. Chandler and S. S. Hemami, in IEEE Trans. Image Proc., vol. 16, no. 9, pp. 2284-2298, September 2007, incorporated herein by reference in its entirety; and quality estimator PSNR, described in "How well do line drawings depict shape?," by F. Cole, K. Sanik, D. DeCarlo, A. Finkelstein, T. Funkhouser, S. Rusinkiewicz, and M. Singh, in ACM Trans. Graphics, vol. 28, no. 3, pp. 28:1-28:9, July 2009, and incorporated herein by reference in its entirety.

In one or more embodiments, the predictive model of the server 130 can be based on subjective data that is collected from viewers of image pairs. For example, the subjective data can be collected using an Amazon Mechanical Turk (AMT), which is suited for the reduced training requirements of relative preference data collection and the need for large-scale data collection. In one or more embodiments, the subjective data from image pairs can be collected using an image quality database. For example, the subjective viewing preferences may be collected using any of the large, publicly available subjective image quality datasets, such as the LIVE, TID2008, and CSIQ databases, which are described in "A statistical evaluation of recent full reference image quality assessment algorithms," by H. R. Sheikh, M. F. Sabir, and A. C. Bovik, IEEE Trans. Image Proc., vol. 15, no. 11, pp. 3440-3451, November 2006, in "TID2008—a database for evaluation of full-reference visual quality assessment metrics," by N. Ponomarenko et al., in Advances of Modern Radioelectronics, vol. 10, pp. 30-45, 2009, and in "Most apparent distortion: Full-reference image quality assessment and the role of strategy," by E. C. Larson and D. M. Chandler, in the Journal of Electronic Imaging, vol. 19, no. 1, March 2010, each reference incorporated herein in its entirety.

In one or more embodiments, a collection of references, or source images, can be chosen from a database of references for using collecting pair-wise preference data. Alternatively, the reference images can be captured using a high quality, high-resolution digital camera. In another embodiment, each of the reference images can initially processed by, for example, filtering, down-sampling, and/or cropping, to produce images of consistent size and resolution. The reference images can be of same or similar subject matter. Alternatively, the reference images can include a range of different subjects or scenes. For example, a set of reference images can include animal pictures, landscapes, and structures (including buildings and sculptures). In one or more embodiments, spatial information (SI) and colorfulness (CF) scores can be captured and computed for each reference image for inclusion into a database of viewing preference data accessible to the server 130.

In one or more embodiments, distortion types can be selected for application to the reference images that are subjectively assessed. For example, the reference images can be processed using such as Gaussian blur, JPEG-2000 and JPEG compression, and additive Gaussian noise. For each distortion type, a range of severity values, from little distortion to moderately severe, can also be selected. The multiplicity of distortion types and distortion severities can result in a large number of distorted images for each reference image and, by extension, a large number of total distorted images for the overall image set that is available for the subjective testing. In an exemplary collection set, a total of 119 distorted images can be generated for each of 90 reference images by using a multiplicity of distortion types and distortion severities. For example, FIGS. 2A and 2B depict an illustrative embodiment of an image pair that is used for performing subjective testing. FIG. 2A depicts a first version of a reference image, with a first distortion, while FIG. 2B depicts a second version of the same reference image with a second distortion. While participating in the subjective test, a viewer declares a preference between the left and right versions of the reference image.

In one embodiment, the viewing preference data is collected by setting up a two-stage subjective test. In the first stage, a first set of distorted reference images can be used to generate data for training the predictive model. In the second stage, a second set of distorted reference images can be used for validating the model. For example, a first set of 3550 distorted images can be generated from a CSIQ image database of 30 images by applying differing types and degrees of distortion to the images. A first set of labeled pairs can be generated from the 3550 distorted images and used for subjective preference testing by viewers. The results of the subjective preference testing are then used for training a logistic regression model for predicting preferences. Next, a second set of 10,690 distorted images can be generated from 90 new images that are subjected to a set of available distortions. This second set of distorted images can be used to generate a second set of labeled pairs. The second set of labeled pairs can then be used to refine validate the logistic regression model that has been generated.

In one or more embodiments, the labeled pairs of images for the subjective testing can be chosen to emphasize important use cases of a QE. In one embodiment, all possible pairs can be decomposed into four sets, based on whether both images share a common reference image or a common distortion type. The subjective testing can contains comparisons across different reference images. The image pairs can be presented to test volunteers (viewers) in random order and/or random left/right assignment. In one embodiment, test subjects can be instructed to, simply, "click on the image with better visual QUALITY between the two images. Choose the image with the better technical quality, not the image content you prefer." In one embodiment, the subjective test can include sets of pairs, where each viewer can limited to a maximum number of pairs. In an exemplary embodiment, a group of 450 unique viewers participated in a subjective study, with no image pair being rated by more than one viewer. Data from viewers whose data was clearly unreliable or showed extreme bias was rejected.

In one or more embodiments, a logistic regression model can be used to predict which image of an image pair will be chosen by a viewer. For example, viewer preference data that has been generated from large-scale subjective testing can be used to fit and/or train a multilevel Bradley-Terry model. In one or more embodiments, a latent subjective quality of each image can be modeled as a function of image level variables, such as the reference image, the distortion type applied to the image, and/or one or more quality estimators, where the effect for each quality estimator differs by distortion type. In one or more embodiments, modeling the subjective quality as a function of image-level variables allows the model to be applied to images outside of those used for training data. In one or more embodiments, the trained multilevel logistic regression model can be used by the server 130 to make predictions about viewer preferences for new image pairs. In one embodiment, the server 130 fits and/or trains the large-scale subjective test data to the multilevel logistic regression model. In another embodiment, the server 130 can receive the model after it has been fitted and/or trained by a different part of the system 100.

In one embodiment, the model can be configured with a result variable, Y. For an image pair i comprising a right image and a left image, $Y_i=1$, if the subject chose the left image, and $Y_i=0$, if the subject chose the right image, for image pairs i=1, . . . , N. In an exemplary embodiment, a total of N=13,674 image pairs were used from the subjective testing, representing 80% of the image pairs from stage 1 of the experiment, while the remaining 20% were held out for validation testing. In one embodiment, viewer variable, V[i], denotes the viewer of image pair i, for viewers w=1, etc. In the exemplary embodiment, a total of 249 viewers participated in the subjective testing. In another embodiment, reference images for the left and right images are denoted as L[i] and R[i], respectively, in pair i, for reference images j=1, . . . , J. In the exemplary embodiment, a total of 30 reference images were used in the subjective testing. In one embodiment, distribution type variables, Dist-L[i] and Dist-R[i], denote the distortion types applied to the left and right images in pair i, for distortion types d=1, . . . , D. In the exemplary embodiment, a total of 4 distortion types were used. In another embodiment, the variables $X_{k[i]}^{QE-L}$ and $X_{k[i]}^{QE-R}$ can be objective quality scores for the kth QE applied to the left and right images in pair i, respectively, for QEs k=1, . . . , K=6. In the exemplary embodiment, six different quality estimator scores were included. In one embodiment, all of the QE scores can be transformed and scaled to have a mean of zero and a standard deviation of one such that the estimated effects for each of the QE scores are comparable, where each increase monotonically with image quality.

In one or more embodiments, a model can be defined for predicting probability that a viewer will select a particular image of the image pair. In one example, a multilevel (i.e.

hierarchical) Bayesian logistic regression model can be used (Equation 1):

$$Y_i \sim \text{Bernoulli}(p_i),$$

$$\log\left(\frac{p_i}{1-p_i}\right) = \alpha_{V[i]}^{viewer} + \lambda_i^{Left} - \lambda_i^{Right}$$

$$\lambda_i^{Left} = \alpha_{L[i]}^{image} + \alpha_{Dist-L[i]}^{distortion-type} + \sum_{k=1}^{K} \beta_{(k,Dist-L)[i]}^{objective} \times X_{k[i]}^{QE-L},$$

for image pairs i=1, . . . , N, where $\lambda_i^{Right}$ is defined analogously to $\lambda_i^{Left}$ and where $\lambda_i^{Right}$ and $\lambda_i^{Left}$ represent latent subjective qualities of the right and left images, respectively. Note that $\lambda_i^{Right}$ and $\lambda_i^{Left}$ are functions of lower level characteristics of the images, such as their reference images, distortion types, and QE scores.

In one or more embodiments, normal priors can be used for the viewer effects, the reference image effects, the distortion type effects, and QE effects. For example, the priors can be:

$\alpha_v^{viewer} \sim N(\mu^{viewer}, \sigma_{viewer}^2),$
$\alpha_r^{image} \sim N(0, \sigma_{image}^2),$
$\alpha_d^{distortion-type} \sim N(0, \sigma_{distortion-type}^2),$
$\beta_{kd}^{objective} \sim N(\mu_k^{objective}, \tau_{objective-dist_k}^2)$
$\mu_k^{objective} \sim N(\mu 0, \tau_{objective}^2),$ In another embodiment, weakly informative half-t priors can be used for the standard deviation parameters $\sigma_{viewer}$, $\sigma_{image}$, $\sigma_{distortion-type}$, and $\tau_{objective-dist\ k}$ (for k=1, . . . , 6), and $\tau_{objective}$, while N(0, 1) priors can be used for $\mu_{viewer}$ and $\mu_0$, as further described in "A weakly informative default prior distribution for logistic and other regression models," by A. Gelman, A. Jakulin, M. G. Pittau, and Y. S. Su, in Annals of Applied Statistics, vol. 2, no. 4, pp. 1360-1383, 2008, incorporated by reference herein in its entirety.

In the exemplary embodiment, inferences can be made for point estimates and interval estimates for various parameters in the model. For example, the mean left/right bias ($\mu_{viewer}$) in the population of subjects for the subjective testing was about 0.06 (on a logistic scale). This corresponds to a probability of a random viewer picking the left image with probability 51.5%. The viewer bias effect, however, was small compared to the effects of the other factors in the model. The estimated standard deviations for the viewer, reference image, and distortion type effects were $\sigma_{viewer}$=0.19 (0.04), $\sigma_{image}$=0.44 (0.07), and $\sigma_{distortion}$=1.03 (0.60), respectively, where the standard errors are listed in parentheses. As can be seen, of these three factors, the distortion type explained the most variation in the outcome, while the viewer bias explained the least variation.

To interpret these group level standard deviations, consider that on the logistic scale, holding all other variables at their observed values, choosing two different distortion types at random would induce an expected change in the probability of choosing the left image of about 25% —a large effect. However, randomly choosing two reference images, or two viewers, would affect the probability of choosing the left image by about 12% or 5%, on average, respectively.

In the exemplary embodiment, for the most extreme variations, the most biased viewers in our experiment had approximately a 44% and 59% probability of choosing the left image, holding all other variables constant. The most preferred reference image, all else held constant, was "sunset color" (74.0% chance of being preferred compared to the average reference image), and the least preferred was "fisher" (26.7%). The estimated effects for distortion types and QEs in the exemplary embodiment are pictured in FIGS. 3A and 3B. FIG. 3A shows that JPEG and JPEG2000 distortions were preferred over Blur and Noise distortions across the images in the subjective testing, where a JPEG-distorted image would be preferred over a noise-distorted image (all else held constant) about 80% of the time, for example. In the exemplary embodiment, 24 objective quality effects were generated and denoted by the parameter set, $\beta_{kd}^{objective}$ (for k=1, . . . , 6 and d=1, . . . , 4). The objective quality effects were more complicated to interpret, since all six QEs are highly correlated with each other. To summarize each of the effects, a posterior distribution of the sum of their effects can be estimated for each distortion type. These estimates of these sums demonstrate values of 1.50, 1.86, 0.57, and 1.86 for the distortion types Blur, JPEG2000, JPEG, and Noise, respectively, with standard errors less than 0.12 in all four cases, as shown in FIG. 3B. In the exemplary data, the six QEs demonstrated the strongest association with the subjective quality for the JPEG2000 and Noise distortion types, and the weakest association for the JPEG and blur distortions.

In a further embodiment, the fit of the model can be verified by making predictions on a holdout set, which can consist of a percentage of the pairs in the data from Stage 1. For each image pair in the holdout set, and for each posterior sample of parameters, an estimated can be computed of the probability that the viewer chose the left image. A response can be simulated from the Bernoulli distribution according to this probability. From these simulations, binned residual plots can be draw to examine the fit of the model.

Figure 4A:
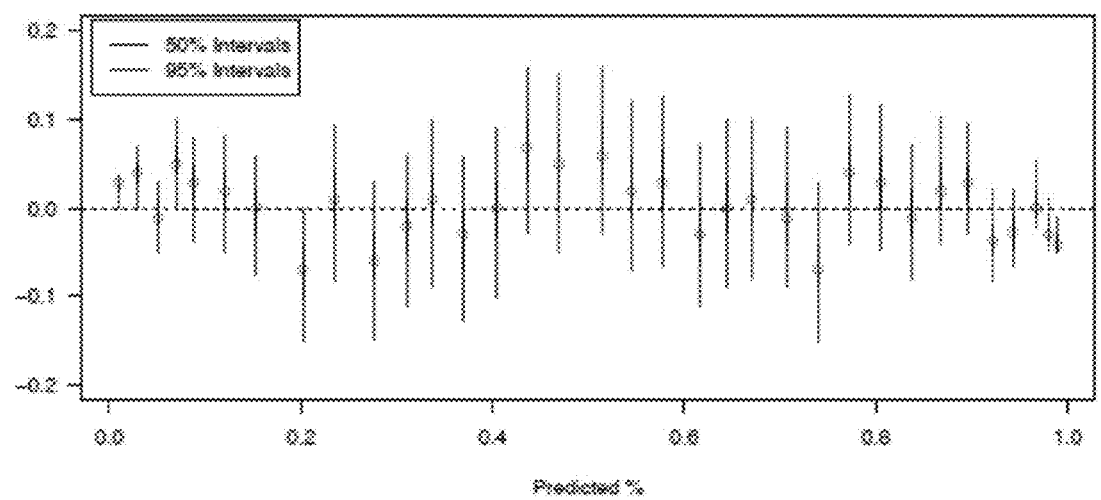
FIGS. 4A and 4B depicts an illustrative embodiment of binned residual plots demonstrating goodness-of-fit of a logistic regression model.

FIG. 4A depicts an illustrative embodiment of the binned residual plot for the exemplary data, where the data points (pairs) are binned by their posterior mean probability of the viewer choosing the left image. Differences between the actual proportion of viewers who chose the left image in each bin and the proportions predicted by the model are centered near zero, with no discernible pattern. Further, the 50% and 95% intervals exhibit the predicted coverage. The binned residual plot demonstrates a strong indication that the model fits well with respect to data that comes from the same population as the data to which the model was fit. Note, however, that when making these predictions, we knew the identities of the viewers of the holdout pairs, we knew the reference images, and we knew the distortion types; this is unlikely to be true for paired-comparison predictions "in the wild."

Figure 4B:
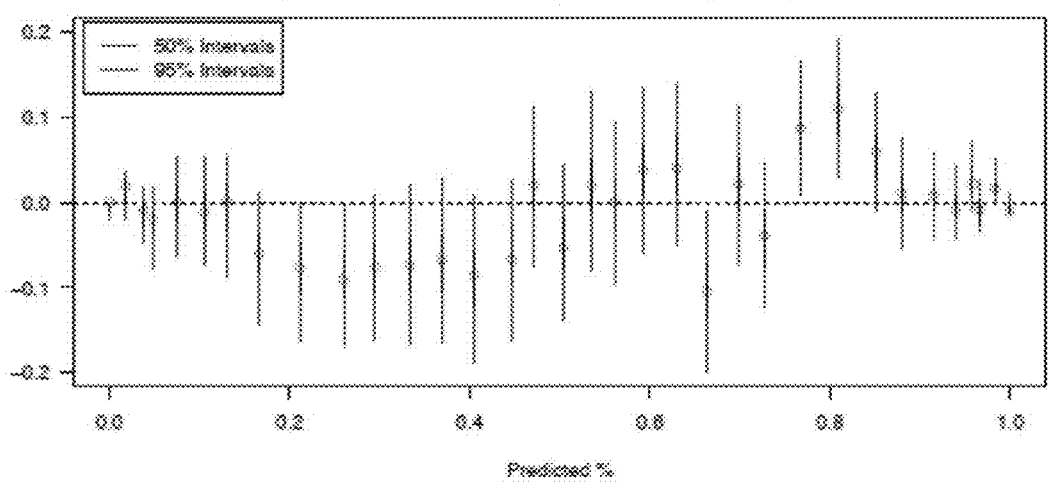
Figure 5:
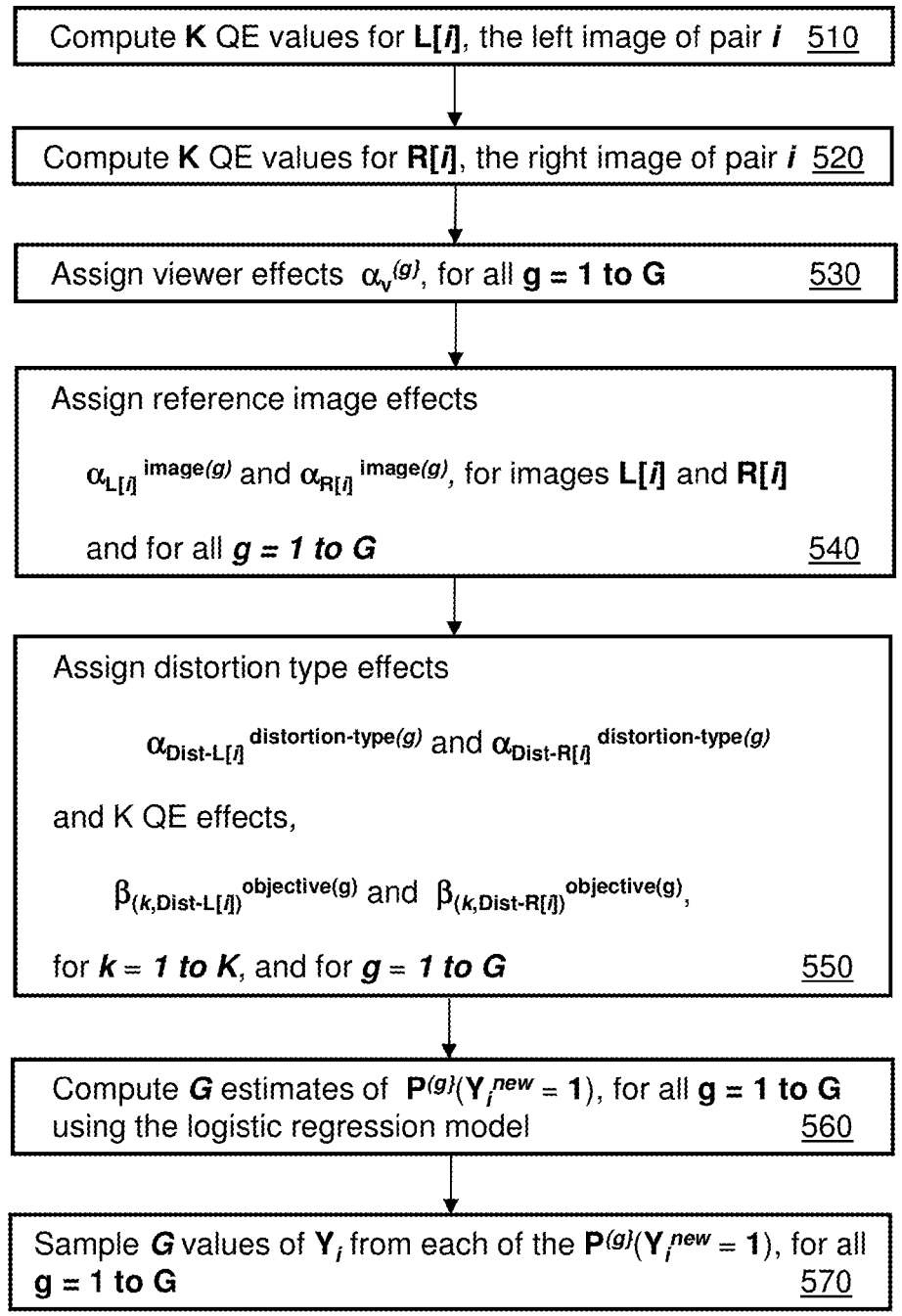
FIGS. 5, 6, 7A and 7B depict an illustrative embodiments of a method operating in portions of the system described in FIG. 1

In one or more embodiments, the RMSE can be calculated for model predictions of the percentage of pairs in which the viewer prefers the left image, for bins with $n_{bin}$=100 pairs. Referring again to FIG. 4A and the exemplary data, the RMSE can be found as the standard deviation of the differences between the plotted black points and the horizontal line at zero. For the holdout data, the RMSE for $n_{bin}$=100 is 3.5%, and the errors are approximately normally distributed. The implication is that about ⅔ of the time the model's calculated prediction is found to be within 3.5% of the true percentage. FIG. 4B depicts the binned residual plot for the validation set, where the RMSE is 4.9%, and there is a slight pattern of shrinkage in the residuals. In one or more embodiments, a misclassification error can be calculated, where a posterior mean of $P(Y_i^{holdout}=1)$ can be used to classify each pair as either having its left or right image chosen by the viewer. For the exemplary data, the misclassification rate was 22.8% for the pairs in the holdout set. By way of comparison, in another exemplary sample of 400 image pairs labeled by two experts, it was found that the experts disagreed on 16% of these image pairs.

In one or more embodiments, the server 130 can used the model to make predictions for new image pairs outside the training population. The basic principle is simple: in the absence of knowing an effect of a particular variable, such as the viewer effect, it is necessary to sample an effect from a distribution of that variable's effects as estimated from the training data. For example, the viewer effect distribution $N(\mu^{viewer}, \sigma_{viewer}^2)$ can be sampled for the viewer effect in the event that the image is being viewed by a viewer who is not part of the training population. By sampling from the distribution, uncertainty can be propagated for a given variable's effect through the model and into the predictions.

FIGS. 5, 6, 7A, and 7B, depict illustrative embodiments of a method operating in portions of the system described in FIG. 1. In one embodiment, $\theta^{(g)}$ denotes a posterior sample g of a parameter $\theta$ in the set of posterior samples G, for g=1, ..., G, and let the variables L and R denote the Left and Right images in the new pair, respectively. Where the viewer, the reference image, or the distortion type for either the L or R image is not known, then the method begins with step 510, where the k QE values can be computed by the server 130 for the left image L[i] of the image pair i. In step 520, the k QE values can be computed by the server 130 for R[i], the right image of pair i. In step 530, viewer effects $\alpha_v^{(g)}$, for all g=1 to G, can be assigned by the server 130 from the distribution according to the viewer.

Figure 6:
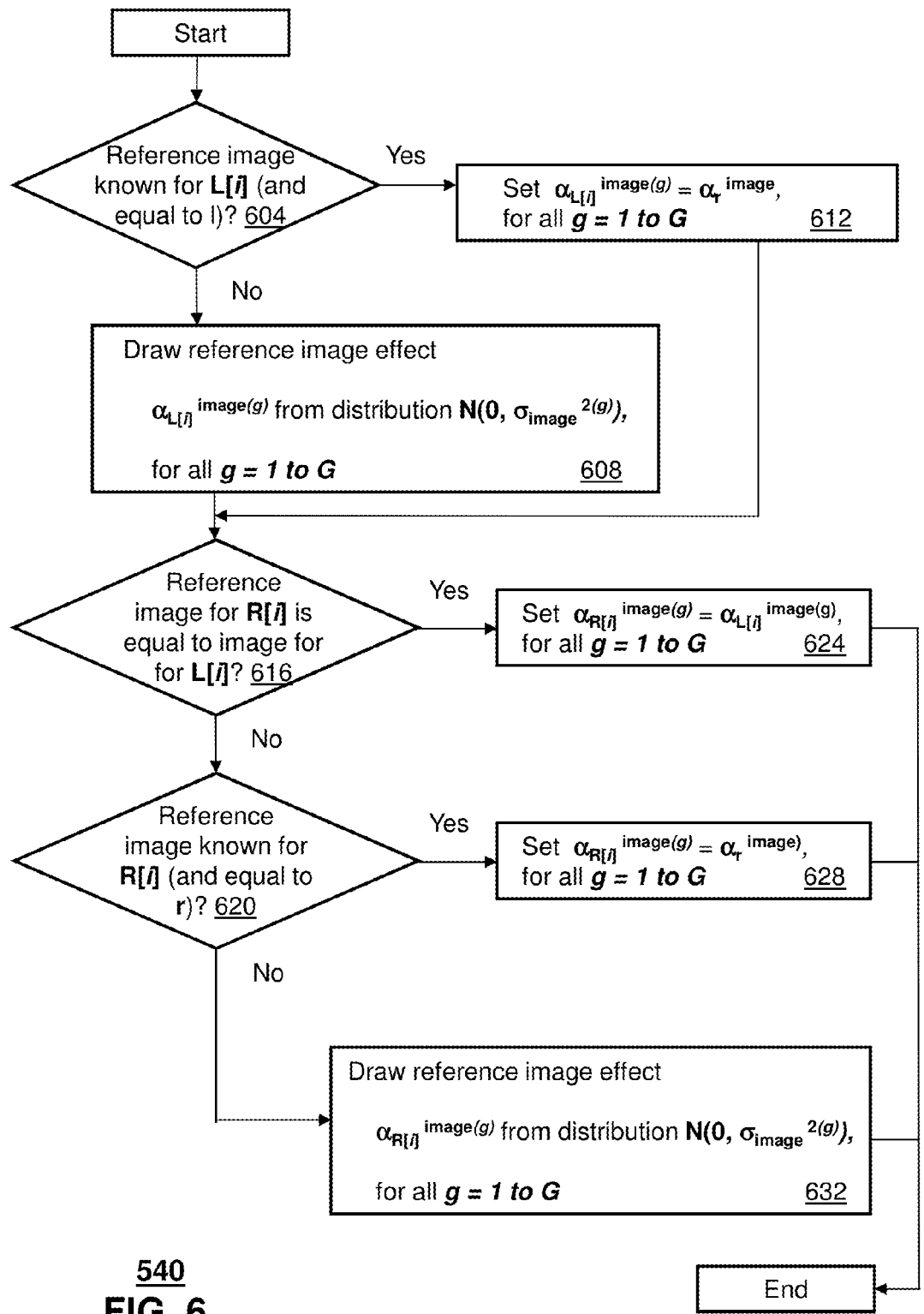

In step 540, the server 130 can assign reference image effects $\alpha_{L[i]}^{image(g)}$ and $\alpha_{R[i]}^{image(g)}$, for images L[i] and R[i] and for all g=1 to G. In one embodiment, the server 130 can sample the reference image effects for the L and R images from their prior distributions. Referring to FIG. 6, further details of step 540 are illustrated. The server 130 can determine, in step 604, whether the reference image for the left image L[i] is a known image to the training database. If the left reference image is known, then the left reference image effect $\alpha_{L[i]}^{image(g)}$ is set to the known reference image effect value $\alpha_l^{image}$ for g from 1 to G. However, if the left reference image L[i] is not known, then the left reference image effect $\alpha_{L[i]}^{image(g)}$ is sampled from the reference image effect distribution $N(0, s_{image}^{2(g)})$, for all g=1 to G.

Once the reference image effect values are obtained in either of step 604 or step 612, then the server 103 can determine if the right reference image R[i] is equal to the left reference image L[i], in step 616. If the right reference image R[i] is equal to the left reference image L[i], then the server 130 can set the right reference image effect $\alpha_{R[i]}^{image(g)}$ to the same value as the left reference image effect $\alpha_{L[i]}^{image(g)}$ for g=1, G, in step 624. If, however, the right reference image R[i] is not the same as the left reference image L[i], then the server 130 can determine if the right reference image R[i] is a known image from the training database, in step 620. If so, then the server 130 can set the right image effect $\alpha_{R[i]}^{image(g)}$ to the known reference image effect value $\alpha_r^{image}$ for g from 1 to G, in step 628. If the right reference image R[i] is not known, then the server 130 can sample the right reference image effect $\alpha_{R[i]}^{image(g)}$ to from the reference image effect distribution $N(0, S_{image}^{2(g)})$, for all g=1 to G.

Figure 7A:
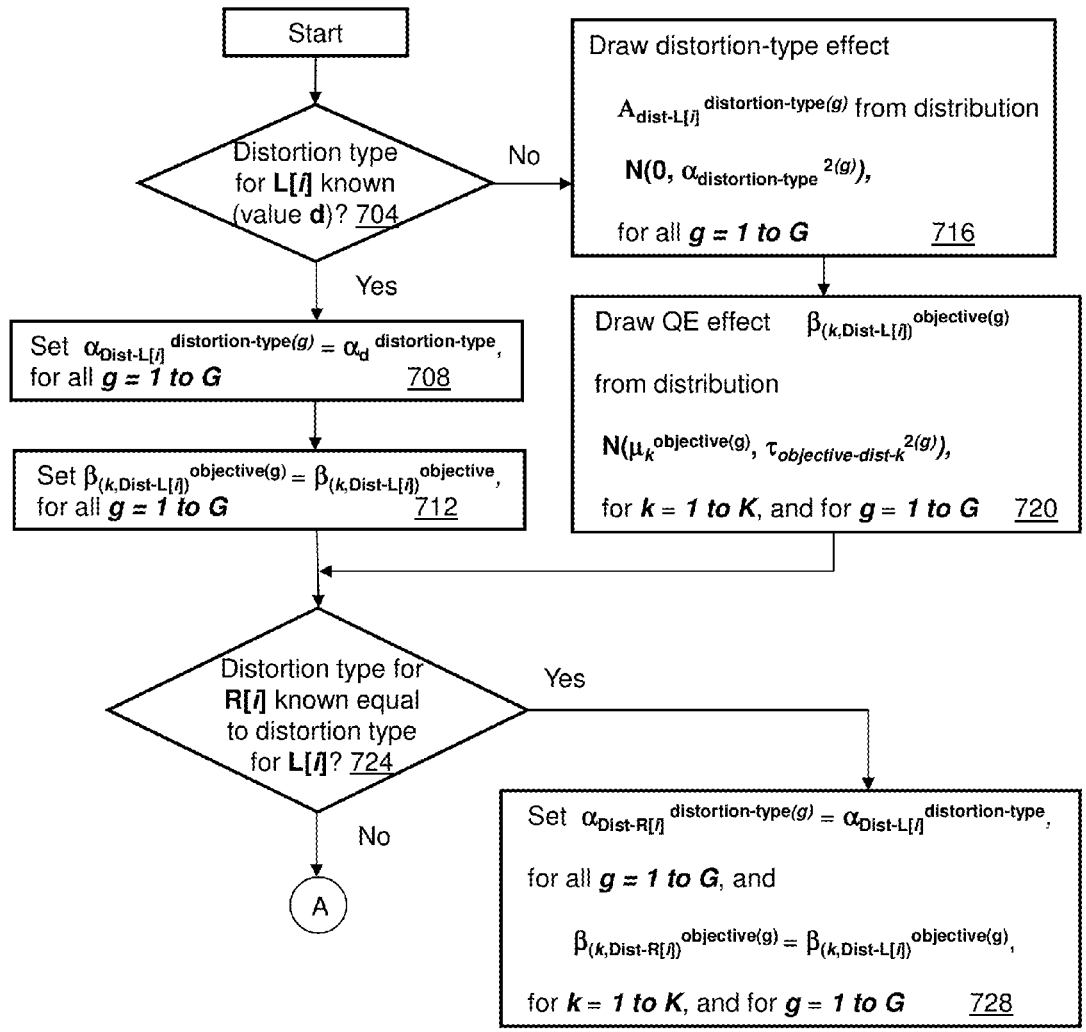
Figure 7B:
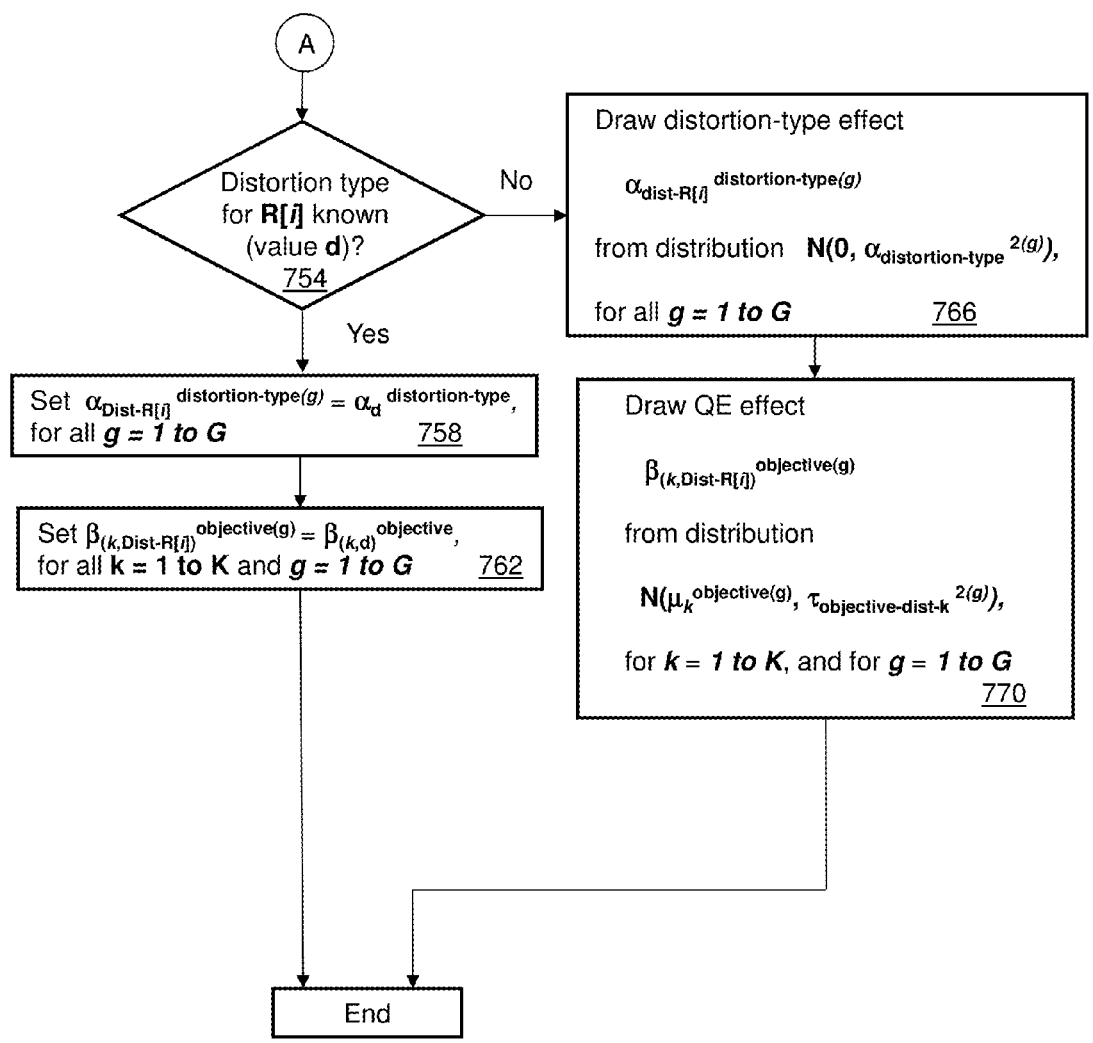

Referring again to FIG. 5, in step 550, the server 130 can assign distortion type effects $\alpha_{Dist-L[i]}^{distortion-type(g)}$ and $\alpha_{Dist-R[i]}^{distortion-type(g)}$ and k QE effects, denoted $\beta_{(k,Dist-L[i])}^{objective(g)}$ and $\beta_{(k,Dist-R[i])}^{objective(g)}$, for k=1 to K, and for g=1 to G, for the left and right images, L[i] and R[i]. In one embodiment, the server 130 can sample the distortion type effects from their prior distributions. Referring now to FIGS. 7A and 7B, further details of step 550 are illustrated. In step 704, the server 130 determines if distortion type of the left image L[i] is known. If the distortion type is not known, then the server 130 can sample the left image distortion type effect $\alpha_{distL[i]}^{distortion-type(g)}$ from the distortion type effect distribution $N(0, \sigma_{distortion-type}^{2(g)})$, for all g=1 to G, in step 716. Subsequently, the server 130 can sample the left image QE effect $\beta_{(k,Dist-L[i])}^{objective(g)}$ from the QE effect distribution $N(\mu_k^{objective(g)}, \tau_{objective-dist-k}^{2(g)})$, for all g=1 to G and k=1 to K, in step 720. If, however, the server 130 determines that the distortion type of the left image L[i] is known (denote it by d), then the server 130 can set the left image distortion type effects $\alpha_{distL[i]}^{distortion-type(g)}$ to the same value as the known distortion type effect $\alpha_d^{distortion-type(g)}$, in step 708, and can set the left image QE effect $\beta_{(k,Dist-L[i])}^{objective(g)}$ to the known QE effect, $\beta_{(k,d)}^{objective(g)}$.

In step 724, the server 130 can determine if the right distortion type Dist-R[i] is equal to the left distortion type Dist-L[i]. If so, then, in step 728, the server 130 can set the right distortion type effects $\alpha_{distR[i]}^{distortion-type(g)}$ to the same values as the left distortion type effects $\alpha_{distL[i]}^{distortion-type(g)}$ for all g=1 to G and can set the right image QE effects data $\beta_{(k,Dist-R[i])}^{objective(g)}$ to the same value as the left image QE effects data $\beta_{(k,Dist-L[i])}^{objective(g)}$ for all k=1 to K and for g=1 to G. If in step 724, the server 130 determines that the right distortion type (Dist-R[i]) is not equal to the left distortion type (Dist-L[i]), in step 754, the server 130 can determine if the distortion type of the right image R[i] is known. If the right image distortion type is not known, then the server 130 can sample the right distortion type effect data $\alpha_{distR[i]}^{distortion-type(g)}$ from the distortion type effect distribution $N(0, \sigma_{distortion-type}^{2(g)})$, for all g=1 to G, in step 766. Subsequently, the server 130 can sample the right image QE effect $\beta_{(k,Dist-R[i])}^{objective(g)}$ from the QE effects distribution $N(\mu_k^{objective(g)}, \tau_{objective-dist-k}^{2(g)})$, for all g=1 to G, and k=1 to K, in step 770. If, however, the server 130 determines that the distortion type of the right image R[i] is known (and equal to d), then the server 130 can set the right distortion type effect $\alpha_{distR[i]}^{distortion-type(g)}$ to the same value as the known distortion type effect $\alpha_d^{distortion-type(g)}$, and in step 758, can set the right image QE effect $\beta_{(k,Dist-R[i])}^{objective(g)}$ to the known value $\beta_{(k,d)}^{objective(g)}$, in step 762, for all g=1, ..., G.

Referring again to FIG. 5, in step 560, the server 130 can compute an estimate of $P^{(g)}(Y_i^{new}=1)$, for all g=1 to G. In step 570, the server 130 can sample a value of $Y^{new}_i$ from each of the $P^{(g)}(Y_i^{new}=1)$, for all g=1 to G to derive an estimated preference outcome for each g=1, ..., G. In one or more embodiments, when either the reference images or the distortion types are known to be the same as those used in the training data, then the posterior distribution is narrower, but not as narrow as when all variables are known.

Figure 8:
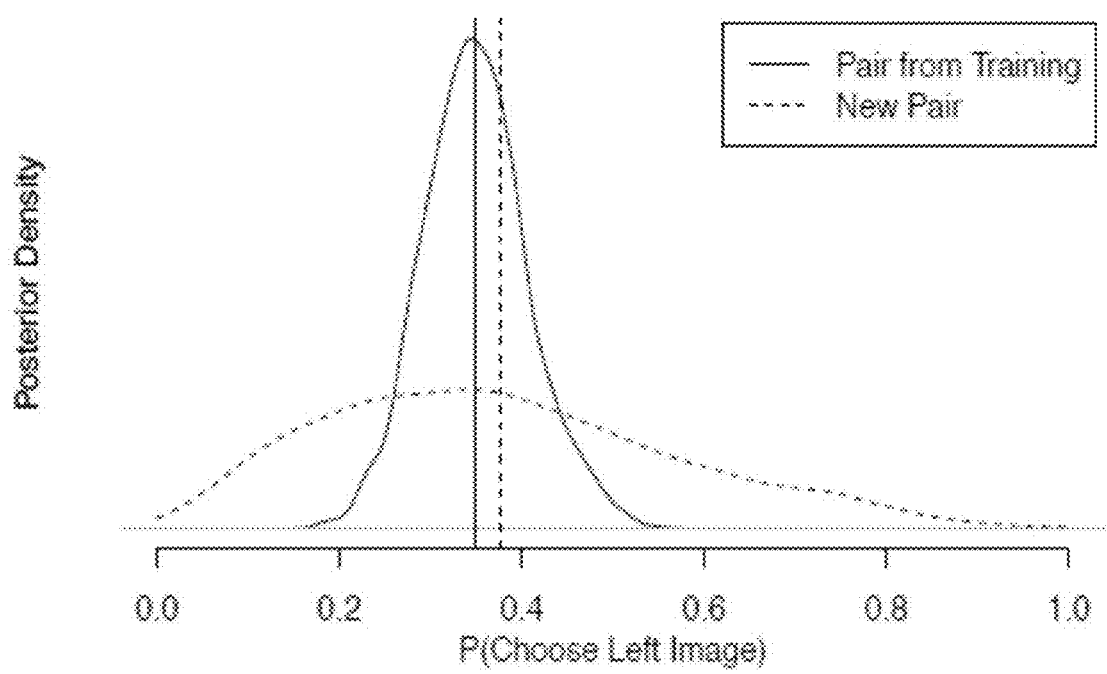
FIG. 8 depicts an illustrative embodiment of density estimates for posterior distribution of probabilities of choosing images from image pairs.

FIG. 8 illustrates density estimates for an exemplary posterior distribution of $P(Y_i^{holdout}=1)$ for a first case where the viewer, distortion types, and reference images are all known (the solid line) and for a second case where none of these variables is known (unequal reference images and equal distortion types are assumed to match the original training data). For example, for an image pair from the holdout set in which the viewer of both images is known from the training data as v=74, where the distortion type is known as noise for each image, and where the six QE scores are known for each image. It is found that the server 130 can predict for this image pair, using information from training, the following viewer and image effects $\hat{\alpha}_{74}^{viewer} \approx 0.01$, $\hat{\alpha}_{10}^{image} \approx -0.05$, and $\alpha_2^{image} \approx -0.10$, for example. Factoring in the QE effects, the posterior mean of the probability of choosing the left image can be estimated as 0.35, with a standard error of about 0.06. However, if an image pair was new, and therefore not associated directly with training data, and if the reference images were different from each other, but the distortion types for both images were the same (allowing these values to cancel), then the server 130 could estimate, using the exemplary data, the probability of choosing the left image as 0.38 with a standard error of 0.19. In other words, the probability for the second situation has moved toward 50%, and the confidence for the probability estimate is lower, due to reduction of known effects.

In another embodiment, the accuracy of the predictions made by the server 130 for new viewers and new reference images can be verified by making predictions on a validation set of data. For example, the Stage 2 of the exemplary embodiment can be used for accuracy validation. Following the procedure outlined above, in the exemplary embodiment, G=1200 samples were computed from the posterior distributions of the probability of choosing the left image in each of the validation image pairs.

Referring again to FIG. 4B, the binned residual plot for predictions made on the validation set for the exemplary data and model is illustrated. A bin size of $n_{bin}$=100 is used (though only 34 bins are shown), to create a visual comparison to the analysis on the holdout set in FIG. 4A. The RMSE of the predicted percentages is 4.9%, and the pattern of residuals indicates that the model is "shrinking" estimated probabilities slightly too far toward 50% for pairs in which the predicted probability is between 20% and 40%. This "shrinking" effect can be due to variation between viewers or reference images in Stage 2 and those in Stage 1, and can cause the estimates of $\alpha_{viewer}$ and $\alpha_{image}$ from the training set to be too large, while possible introducing extra randomness into predictions. The misclassification rate for the validation set was 19.6% for the exemplary data, which is substantially lower than that of the holdout set. The misclassification rate with respect to four classes of pairs was found to be 19.1%, 24.2%, 15.2%, and 17.8%.

Upon reviewing the aforementioned embodiments, it would be evident to an artisan with ordinary skill in the art that said embodiments can be modified, reduced, or enhanced without departing from the scope and spirit of the claims described below. In one or more embodiments, the evaluation of the QEs can be performed by devices other than the server 130, including in a distributed environment and/or utilizing CPE.

Figure 9:
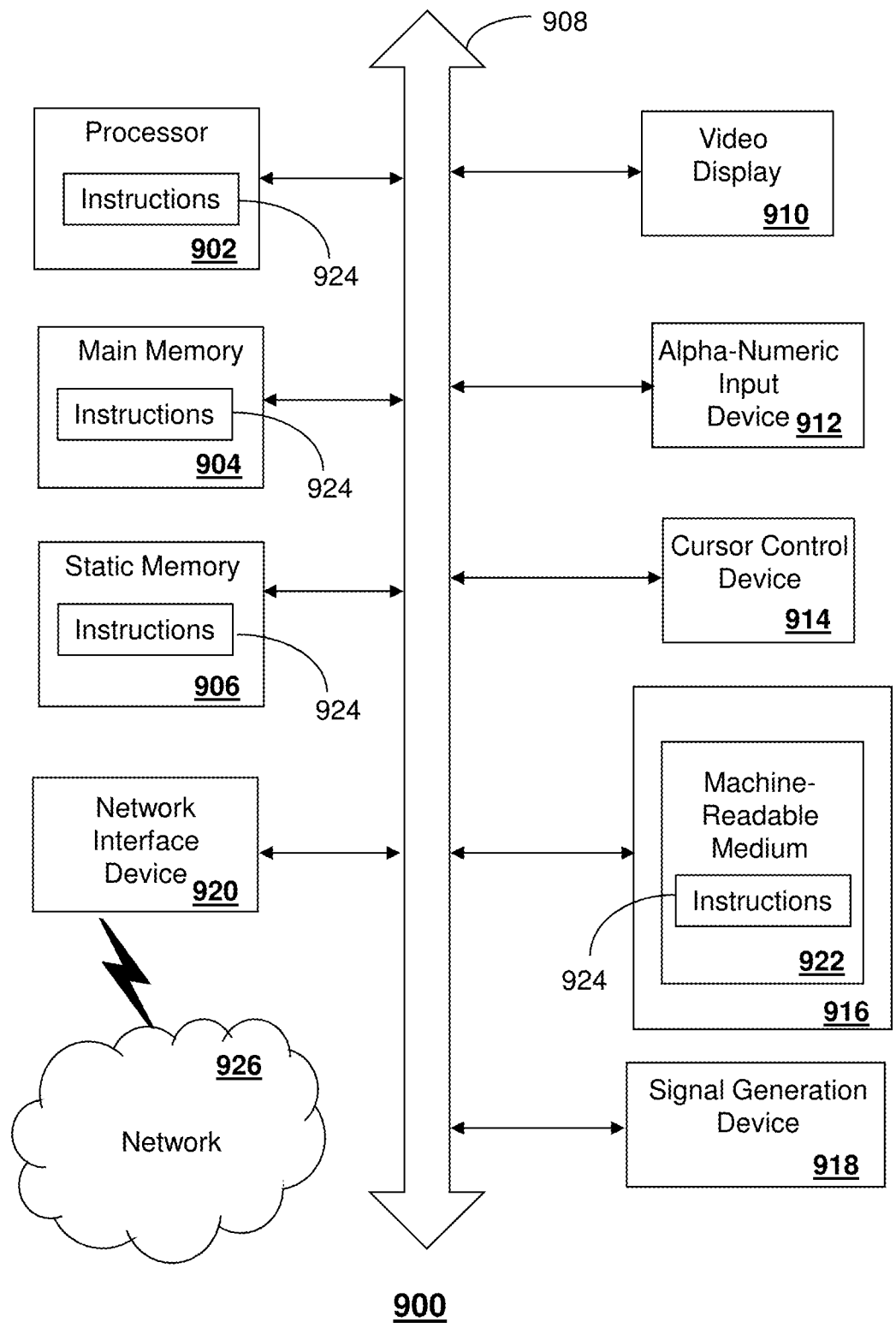
FIG. 9 is a diagrammatic representation of a machine in the form of a computer system within which a set of instructions, when executed, may cause the machine to perform any one or more of the methods discussed herein.

FIG. 9 depicts an exemplary diagrammatic representation of a machine or controller circuit in the form of a computer system 900 within which a set of instructions, when executed, may cause the machine to perform any one or more of the methods discussed above. One or more instances of the machine can operate, for example, as the server 130 as described above. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 900 may include a processor 902 (e.g., a central processing unit (CPU), a graphics processing unit (GPU, or both), a main memory 904 and a static memory 906, which communicate with each other via a bus 908. The computer system 900 may further include a video display unit 910 (e.g., a liquid crystal display (LCD), a flat panel, or a solid state display. The computer system 900 may include an input device 912 (e.g., a keyboard), a cursor control device 914 (e.g., a mouse), a disk drive unit 916, a signal generation device 918 (e.g., a speaker or remote control) and a network interface device 920.

The disk drive unit 916 may include a tangible computer-readable storage medium 922 on which is stored one or more sets of instructions (e.g., software 924) embodying any one or more of the methods or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 922 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the present disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA) are contemplated for use by computer system 800.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as separately claimed subject matter.

What is claimed is:

1. A method comprising:
obtaining, by a processing system comprising a processor, a first set of viewer bias data for a first viewer of first image content that has been distorted by a first distortion type and a second set of viewer bias data for a second viewer of second image content that has been distorted by a second distortion type;
generating, by the processing system, a regression model of viewing preference data that is based on the first set of viewer bias data and the second set of viewer bias data;
calculating, by the processing system, a preference estimate from the regression model of viewing preference data, wherein the preference estimate corresponds to a probability that the first image content that has been distorted by the first distortion type is preferred by a third over the second image content that has been distorted by the second distortion type;
selecting, by the processing system, a target distortion type from the first distortion type or the second distortion type according to the preference estimate; and
adjusting, by the processing system, content for distribution to viewer equipment utilizing a distribution process that is selected based on the target distortion type.

2. The method of claim 1, wherein the regression model of viewing preference data comprises a logistic regression model of the viewing preference data.

3. The method of claim 1, wherein the distribution process comprises a target video compression process selected from among a group of video compression processes.

4. The method of claim 1, wherein the first distortion type comprises one of a Gaussian blur, an image compression, an additive Gaussian noise, or a combination thereof.

5. The method of claim 1, wherein the first set of viewer bias data and the second set of viewer bias data are obtained by sampling a variable effect distribution of the viewing preference data associated with the first viewer and the second viewer.

6. The method of claim 1, wherein the first image content originates from first media content and the second image content originates from second media content, and wherein the first media content is different from the second media content.

7. The method of claim 1, further comprising calculating, by the processing system, a confidence value according to the first set of viewer bias data and the second set of viewer bias data, wherein the confidence value further defines a characteristic of the preference estimate.

8. The method of claim 7, wherein the selecting of the target distortion type is further according to the confidence value.

9. A computer-readable storage device comprising executable instructions, which when executed by a processing system including a processor cause the processing system to perform operations comprising:
logging image pair preference observations from a first viewer of first image content that has been distorted by a first distortion type and a second set of viewer bias data for a second viewer of second image content that has been distorted by a second distortion type;
sampling a variable effect distribution constructed from the image pair preference observations to obtain a first set of viewer bias data for the first viewer and a second set of viewer bias data for the second viewer;
generating a regression model of viewing preference data that is based on the first set of viewer bias data and the second set of viewer bias data;
calculating a preference estimate from the regression model of viewing preference data, wherein the preference estimate corresponds to a probability that the first image content that has been distorted by the first distortion type is preferred by a third viewer over the second image content that has been distorted by the second distortion type;

selecting a target distortion type of the first distortion type or the second distortion type for processing content according to the preference estimate; and adjusting content for distribution to viewer equipment utilizing a distribution process that is selected based on the target distortion type.

10. The storage device of claim 9, wherein the regression model of viewing preference data comprises a logistic regression model.

11. The storage device of claim 9, wherein the operations further comprise determining a confidence value according to the first set of viewer bias data and the second set of viewer bias data, wherein the confidence value further defines a characteristic of the preference estimate.

12. A server comprising:

a memory having executable instructions; and a processing system including a processor coupled with the memory, wherein the processing system when executing the executable instructions performs operations comprising:

receiving content for distribution;

calculating a preference estimate from a regression model of viewing preference data, wherein the regression model is based on a first set of viewer bias data for a first viewer of first image content that has been altered by a first distortion type and a second set of viewer bias data for a second viewer of second image content that has been altered by a second distortion type, wherein the preference estimate corresponds to a probability that the first image content is preferred over the second image content;

selecting a target distortion type from the first distortion type or the second distortion type according to the preference estimate; and adjusting the content for distribution to viewer equipment utilizing a distribution process that is selected based on the target distortion type.

13. The server of claim 12, wherein the regression model of the viewing preference data comprises a logistic regression model.

14. The server of claim 12, wherein the first set of viewer bias data and the second set of viewer bias data are obtained by sampling a variable effect distribution of the viewing preference data associated with the first viewer and the second viewer.

15. The server of claim 12, wherein the distribution process comprises a target video compression process selected from among a group of video compression processes.

16. The server of claim 12, wherein the first image content originates from first media content and the second image content originates from second media content, and wherein the first media content is different from the second media content.

17. The server of claim 12, wherein the operations further comprise determining a confidence value according to the first set of viewer bias data and the second set of viewer bias data, wherein the confidence value further defines a characteristic of the preference estimate.

18. The server of claim 17, wherein the selecting of the target distortion type is further according to the confidence value.

19. The server of claim 12, wherein the content comprises video content.

20. The server of claim 12, wherein the first distortion type comprises one of a Gaussian blur, an image compression, an additive Gaussian noise, or a combination thereof.

* * * * *